United States Patent
Tamai

(10) Patent No.: US 10,860,901 B2
(45) Date of Patent: Dec. 8, 2020

(54) DETECTION SYSTEM, INFORMATION PROCESSING APPARATUS, EVALUATION METHOD, AND PROGRAM

(71) Applicant: OMRON Corporation, Kyoto (JP)

(72) Inventor: Toshinori Tamai, Nara (JP)

(73) Assignee: OMRON Corporation, Kyoto (JP)

(*) Notice: Subject to any disclaimer, the term of this patent is extended or adjusted under 35 U.S.C. 154(b) by 142 days.

(21) Appl. No.: 16/127,278

(22) Filed: Sep. 11, 2018

(65) Prior Publication Data

US 2019/0188543 A1 Jun. 20, 2019

(30) Foreign Application Priority Data

Dec. 14, 2017 (JP) ................ 2017-239640

(51) Int. Cl.
*G06K 9/00* (2006.01)
*G06K 9/66* (2006.01)
(Continued)

(52) U.S. Cl.
CPC ............. *G06K 9/66* (2013.01); *G06K 9/2027* (2013.01); *G06K 9/3241* (2013.01);
(Continued)

(58) Field of Classification Search
None
See application file for complete search history.

(56) References Cited

U.S. PATENT DOCUMENTS 4,509,075 A * 4/1985 Simms .............. G06T 5/50
250/223 B
7,283,659 B1 * 10/2007 Bakker .............. G06K 9/6254
382/144
(Continued)

FOREIGN PATENT DOCUMENTS

JP 2017-49974 A 3/2017

OTHER PUBLICATIONS

Christopher M. Mishop, "Neural Networks for Pattern Recognition", Retrieved from the Internet (URL: http://citeseerx.ist.psu.edu/viewdoc/download?doi=10.1.1.679.1104&rep=rep1&type=pdf [retrieved on Mar. 13, 2019]), Dec. 31, 1995, p. 345-345; relevance is indicated in the extended European search report issued on Mar. 20, 2019.

(Continued)

*Primary Examiner* — Shervin K Nakhjavan
(74) *Attorney, Agent, or Firm* — Metrolex IP Law Group, PLLC

(57) ABSTRACT

A detection system includes an image processing apparatus configured to discriminate whether or not there is a detection target contained in an object, using a discriminator, and an information processing apparatus configured to provide the discriminator to the image processing apparatus. The information processing apparatus includes an evaluation unit configured to evaluate, for each attribute, discrimination precisions of the discriminator before and after the additional training, using evaluation data associated with each of a plurality of attributes of an object, when the discriminator is additionally trained using the training data, and an output unit configured to output the discrimination precisions for each attribute.

19 Claims, 14 Drawing Sheets

(51) Int. Cl.
*G06K 9/32* (2006.01)
*G06K 9/62* (2006.01)
*G06K 9/20* (2006.01)

(52) U.S. Cl.
CPC ......... *G06K 9/6234* (2013.01); *G06K 9/6253* (2013.01); *G06K 9/6256* (2013.01); *G06K 9/6262* (2013.01); *G06T 2207/20081* (2013.01)

(56) References Cited

U.S. PATENT DOCUMENTS

| | | | | |
|---|---|---|---|---|
| 9,449,259 | B1* | 9/2016 | Cheng | G06K 9/6217 |
| 10,002,430 | B1* | 6/2018 | Mundhenk | G06K 9/6265 |
| 10,372,228 | B2* | 8/2019 | Mao | A63F 13/213 |
| 2002/0001759 | A1* | 1/2002 | Ohashi | G01N 21/956 |
| | | | | 430/5 |
| 2002/0159643 | A1* | 10/2002 | DeYong | G06K 9/00 |
| | | | | 382/228 |
| 2004/0156540 | A1* | 8/2004 | Gao | G06T 7/0004 |
| | | | | 382/145 |
| 2005/0226495 | A1* | 10/2005 | Li | G06K 9/6253 |
| | | | | 382/159 |
| 2008/0082468 | A1* | 4/2008 | Long | G06K 9/00147 |
| | | | | 706/12 |
| 2012/0263376 | A1* | 10/2012 | Wang | G06K 9/6256 |
| | | | | 382/160 |
| 2012/0330570 | A1* | 12/2012 | Hedl | G01N 29/043 |
| | | | | 702/39 |
| 2014/0005477 | A1* | 1/2014 | Gupta | A61B 1/00009 |
| | | | | 600/109 |
| 2016/0358041 | A1* | 12/2016 | Venkataraman | G06K 9/6269 |
| 2017/0069075 | A1* | 3/2017 | Okuda | G06K 9/6284 |
| 2017/0082555 | A1* | 3/2017 | He | G06N 20/00 |
| 2018/0174000 | A1* | 6/2018 | Takagi | G01N 21/8851 |
| 2019/0073557 | A1* | 3/2019 | Matsuda | G06K 9/4609 |

OTHER PUBLICATIONS

Edwin Lughofer, "On-line evolving image classifiers and their application to surface inspection", Image and Vision Computing, Jul. 31, 2010, pp. 1065-1079, vol. 28, No. 7, Guildford, GB; relevance is indicated in the extended European search report issued on Mar. 20, 2019.

Jerry Alan Fails et al., "Interactive machine learning", IUI Mar. 2003 International Conference on Intelligent User Interfaces: Miami, Florida, USA, Jan. 12-15, 2003, Jan. 12, 2003, pp. 39-45, ACM Press, New York, NY; relevance is indicated in the extended European search report issued on Mar. 20, 2019.

Extended European search report dated Mar. 20, 2019 in a counterpart European patent application.

* cited by examiner

| Attribute | | | | Additional training data |
|---|---|---|---|---|
| Surface shape | Reflectance | Transparency | ... | |
| Smooth | High | High | | — |
| | | Medium | | — |
| | | Low | | O |
| | Medium | ... | | — |
| .... | | | | |
| Rough | Low | Low | | O |
| .... | | | | |

FIG. 10A

| Attribute | | | | Additional training data | Number of pieces of evaluation data | Total number of pieces of data |
|---|---|---|---|---|---|---|
| Surface shape | Reflectance | Transparency | ... | | | |
| Smooth | High | High | ... | — | 100 | 1,000 |
| | | Medium | ... | — | 100 | 1,000 |
| | | Low | ... | ○ | 100 | 1,000 |
| ... | | | | | | |
| Rough | Low | Low | ... | ○ | 100 | 1,000 |
| ... | | | | | | |

FIG. 10B

| Attribute | | | | Additional training data | Number of pieces of evaluation data | Total number of pieces of data |
|---|---|---|---|---|---|---|
| Surface shape | Reflectance | Transparency | ... | | | |
| Smooth | High | High | ... | — | 100 | 1,000 |
| | | Medium | ... | — | 100 | 1,000 |
| | | Low | ... | ○ | 1,000 | 1,000 |
| ... | | | | | | |
| Rough | Low | Low | ... | ○ | 3,000 | 3,000 |
| ... | | | | | | |

FIG. 13A

| Attribute | | | Additional training data | Discrimination precision Before additional training | | Discrimination precision After additional training | |
|---|---|---|---|---|---|---|---|
| Surface shape | Reflectance | Transparency | | Accuracy | Defect recognition | Accuracy | Defect recognition |
| Smooth | High | Low | ○ | 80% | 82% | 96% | 90% |
| Rough | Low | Low | ○ | 78% | 80% | 94% | 88% |
| ... | ... | ... | ... | ... | ... | ... | ... |
| Uneven | Low | High | — | 75% | 72% | 80% | 68% |

FIG. 13B

| | Discrimination precision Before additional training | | Discrimination precision After additional training | |
|---|---|---|---|---|
| | Accuracy | Defect recognition | Accuracy | Defect recognition |
| Additional training data (for testing) | 74% | 78% | 98% | 92% |

DETECTION SYSTEM, INFORMATION PROCESSING APPARATUS, EVALUATION METHOD, AND PROGRAM

CROSS-REFERENCES TO RELATED APPLICATIONS

This application claims priority to Japanese Patent Application No. 2017-239640 filed Dec. 14, 2017, the entire contents of which are incorporated herein by reference.

FIELD

The disclosure relates to a detection system, an information processing apparatus, an evaluation method, and a program.

BACKGROUND

In the field of FA (factory automation), techniques for inspecting workpieces that are objects to be inspected, by capturing images of the workpieces and automatically analyzing the captured images, are widely used.

JP 2017-049974A describes that feature amounts for discriminating whether or not objects to be inspected are proper are selected from images of objects to be inspected, whether or not whose appearances are proper is known, captured in at least two different image capturing conditions, and a discriminator for discriminating whether or not objects to be inspected are proper is generated based on the selected feature amounts.

JP 2017-049974A is an example of a background art.

SUMMARY

In order to improve the discrimination precision of a discriminator generated through machine learning, typically, new training data containing a detection target in an object is prepared, and the discriminator is additionally trained with that data so that the discrimination precision of the discriminator is improved. However, in machine learning, it is typically difficult to predict a learning result, and overfitting may occur in which the analysis corresponds excessively to learning data, and thus, if a discriminator is additionally trained, the discrimination precision for other objects than those objects contained in the training data, used in the additional training may deteriorate compared with that before training. For example, if a discriminator is additionally trained for an object with a glossy metal surface, the discrimination precision for objects with a glossy surface is improved, whereas the discrimination precision for objects with an uneven surface may deteriorate. Thus, if an additionally trained discriminator is used, a deterioration unexpected by the user may occur in the discrimination precision for some objects. Thus, it may be necessary to perform training again depending on the objects that are to be discriminated or a user's purpose.

One or more aspects may provide a technique for obtaining a discriminator that matches a user's purpose, by quantitatively evaluating objects for which a discrimination precision is improved when a discriminator is additionally trained, and the other objects.

An aspect is directed to a detection system including: an image processing apparatus including an image capturing unit and a trainable discriminator, and configured to discriminate, using the discriminator, whether or not there is a detection target contained in an object whose image has been captured by the image capturing unit; and an information processing apparatus configured to provide the discriminator to the image processing apparatus, wherein the information processing apparatus includes: a first storage unit configured to store a discriminator trained to discriminate whether or not there is a detection target contained in an object; a second storage unit configured to store evaluation data for use in evaluation of a discrimination precision of the discriminator, in association with each of a plurality of attributes of an object; a third storage unit configured to store training data for additionally training the discriminator; a training unit configured to additionally train the discriminator using the training data; an evaluation unit configured to evaluate, for each attribute, discrimination precisions of the discriminator before the additional training and after the additional training, using the evaluation data; and an output unit configured to output the discrimination precisions for each attribute. According to an aspect, the influence range of additional training can be provided to a user in a visible form, and thus the user can obtain a discriminator that matches a user's purpose, by quantitatively evaluating objects for which a discrimination precision is improved when a discriminator is additionally trained, and the other objects.

In an aspect, it is also possible that the information processing apparatus further includes a receiving unit configured to receive designation of at least one of the plurality of attributes from a user, and the evaluation unit evaluates discrimination precisions of the discriminator before the additional training and after the additional training, for the received at least one attribute. It is also possible that the third storage unit stores the training data in association with at least one of the plurality of attributes, and the output unit performs output such that the at least one attribute associated with the training data is identifiable. It is also possible that the information processing apparatus further includes a registration unit configured to receive the training data and the at least one attribute that is associated with the training data from a user, and register them into the third storage unit. According to aspects, the discrimination precisions of a discriminator before and after additional training can be evaluated using part of training data designated by a user, and thus the user can more quantitatively see whether or not the discriminator has been trained to achieve a desired level of discrimination precision.

In an aspect, it is also possible that the information processing apparatus further includes an update unit configured to perform processing of updating the discriminator included in the image processing apparatus to the discriminator additionally trained by the training unit, based on evaluation of the discrimination precisions for each attribute by the evaluation unit. It is also possible that the update unit performs processing of updating the discriminator included in the image processing apparatus to the discriminator additionally trained by the training unit, if the discrimination precision evaluated using the evaluation data, for the at least one attribute associated with the training data, is higher after the additional training than before the additional training. According to aspects, if an evaluation result indicating that, when additional training is performed, a training effect for an attribute of an inspection object for which the additional training has been performed is achieved, the discriminator included in the detection apparatus can be updated to an additionally trained discriminator, and thus a detection apparatus with a higher level of discrimination precision can be provided.

In an aspect, it is also possible that processing of updating the discriminator included in the image processing apparatus to the discriminator additionally trained by the training unit may be performed if an instruction to update the discriminator is received from a user. According to an aspect, the discriminator of the inspection apparatus can be prevented from being updated without permission from a user.

In an aspect, it is also possible that the registration unit additionally registers the training data as new evaluation data into the second storage unit, in association with the at least one attribute associated with the training data. According to an aspect, the number of pieces of evaluation data can be increased, and thus a discriminator can be evaluated in more detail.

In an aspect, it is also possible that the evaluation unit receives, for each attribute, designation of the number of pieces of evaluation data for use in evaluation of the discriminator, from a user, and evaluates, for each attribute, the discrimination precision using the received number of pieces of evaluation data. According to an aspect, for example, evaluation for an unnecessary attribute can be performed with a small number of pieces of data, and thus CPU resources or memory resources of the information processing apparatus can be reduced.

Furthermore, another aspect is directed to an information processing apparatus including: a first storage unit configured to store a discriminator trained to discriminate whether or not there is a detection target contained in an object; a second storage unit configured to store evaluation data for use in evaluation of a discrimination precision of the discriminator, in association with each of a plurality of attributes of an object; a third storage unit configured to store training data for additionally training the discriminator; a training unit configured to additionally train the discriminator using the training data; an evaluation unit configured to evaluate, for each attribute, discrimination precisions of the discriminator before the additional training and after the additional training, using the evaluation data; and an output unit configured to output the discrimination precisions for each attribute. According to an aspect, the influence range of additional training can be provided to a user in a visible form, and thus the user can obtain a discriminator that matches a user's purpose, by quantitatively evaluating objects for which a discrimination precision is improved when a discriminator is additionally trained, and the other objects.

Furthermore, another aspect is directed to an evaluation method performed by an information processing apparatus including a first storage unit configured to store a discriminator trained to discriminate whether or not there is a detection target contained in an object, a second storage unit configured to store evaluation data for use in evaluation of a discrimination precision of the discriminator, in association with each of a plurality of attributes of an object, and a third storage unit configured to store training data for additionally training the discriminator, the method including: a step of additionally training the discriminator using the training data; a step of evaluating, for each attribute, discrimination precisions of the discriminator before the additional training and after the additional training, using the evaluation data; and a step of outputting the discrimination precisions for each attribute. According to an aspect, the influence range of additional training can be provided to a user in a visible form, and thus the user can obtain a discriminator that matches a user's purpose, by quantitatively evaluating objects for which a discrimination precision is improved when a discriminator is additionally trained, and the other objects.

Furthermore, another aspect is directed to a program for causing a computer to function as: a first storage part configured to store a discriminator trained to discriminate whether or not there is a detection target contained in an object; a second storage part configured to store evaluation data for use in evaluation of a discrimination precision of the discriminator, in association with each of a plurality of attributes of an object; a third storage part configured to store training data for additionally training the discriminator; a training part configured to additionally train the discriminator using the training data; an evaluation part configured to evaluate, for each attribute, discrimination precisions of the discriminator before the additional training and after the additional training, using the evaluation data; and an output part configured to output the discrimination precisions for each attribute. According to an aspect, the influence range of additional training can be provided to a user in a visible form, and thus the user can obtain a discriminator that matches a user's purpose, by quantitatively evaluating objects for which a discrimination precision is improved when a discriminator is additionally trained, and the other objects.

According to one or more aspects, it is possible to provide a technique for obtaining a discriminator that matches a user's purpose, by quantitatively evaluating objects for which a discrimination precision is improved when a discriminator is additionally trained, and the other objects.

BRIEF DESCRIPTION OF THE DRAWINGS

FIGS. 10A and 10B are diagrams each illustrating an example of screens for receiving settings of the number of pieces of evaluation data for use in evaluation of a discriminator.

FIGS. 13A and 13B are each diagram illustrating an example of screens for displaying an evaluation result.

DETAILED DESCRIPTION

Figure 1:
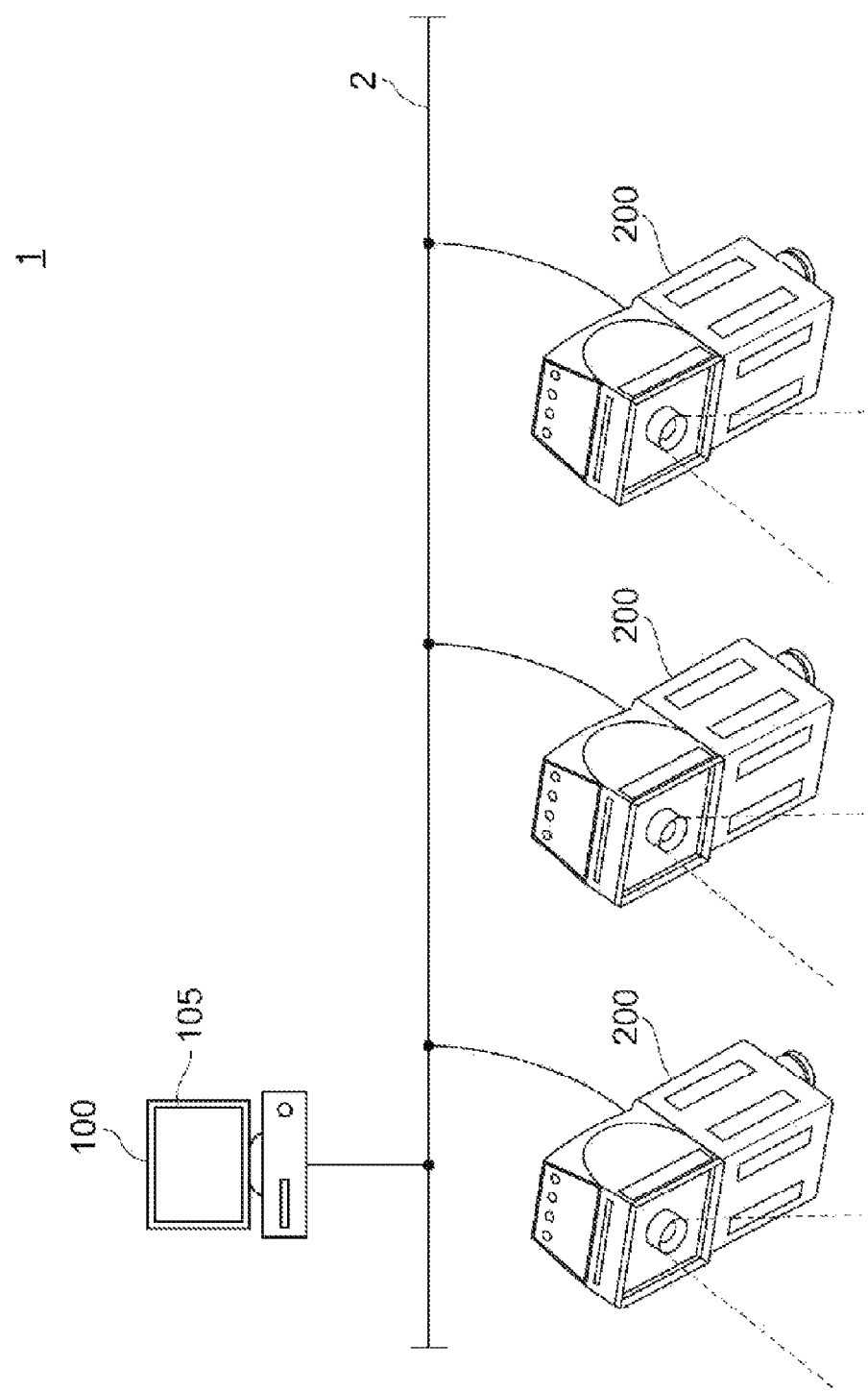
FIG. 1 is a diagram schematically illustrating an example of an application situation of an image processing system according to one or more embodiments.

Hereinafter, embodiments will be described with reference to the accompanying drawings. In the drawings, constituent elements denoted by the same reference numerals have the same or similar configurations.

§ 1 Application Example

First, an example of a situation to which one or more embodiments are applied will be described with reference to FIG. 1. FIG. 1 schematically shows an example of an application situation of an image processing system 1 according to one or more embodiments. The image processing system 1 is installed typically in production lines or the like. The image processing system 1 performs processing such as inspection of objects to be inspected or recognition of text characters based on images captured from the objects to be inspected that are being conveyed on production lines. Note that the objects to be inspected are an example of an "object" of one or more embodiments. The image processing system 1 is an example of a "detection system" of one or more embodiments. Furthermore, the objects to be inspected may be any objects, but a description in one or more embodiments will be given assuming that they are workpieces such as parts in the production process or products.

Figure 2:
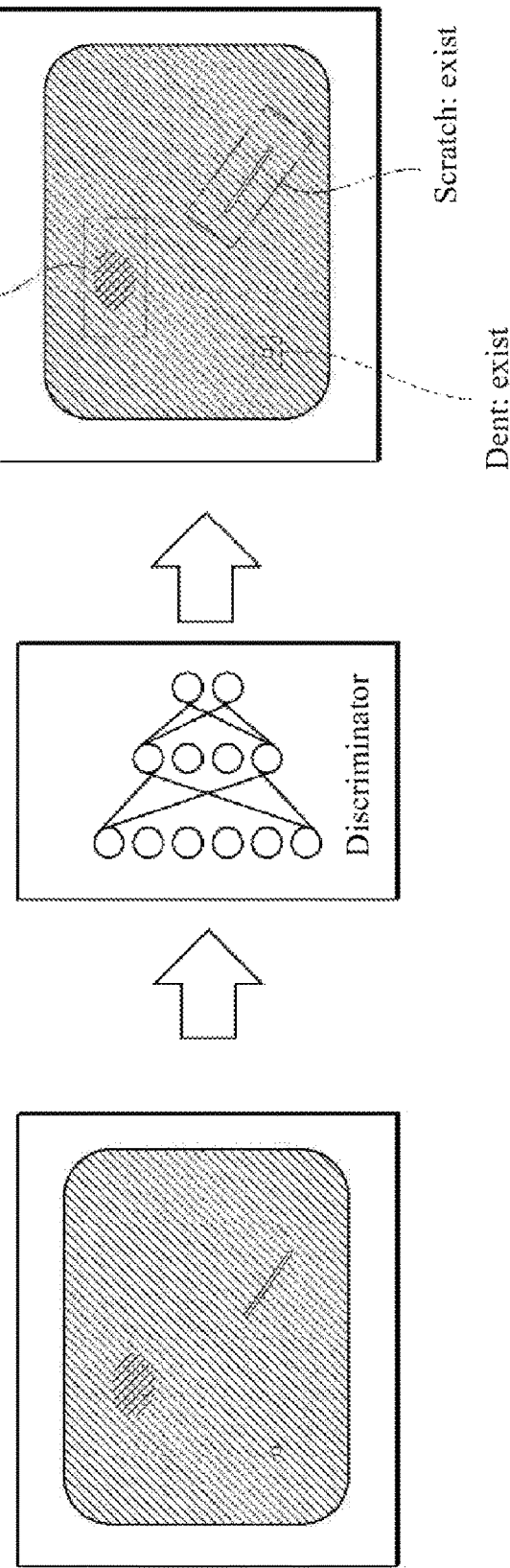
FIG. 2 is a diagram illustrating an example of an operation of a discriminator.

As shown in FIG. 1, the image processing system 1 includes a management apparatus 100, and one or more image processing apparatuses 200 configured to communicate with the management apparatus 100 via a network 2. For example, a workpiece is conveyed in a predetermined direction by a conveyor mechanism such as a belt conveyor, and each of the image processing apparatuses 200 is arranged at a predetermined position with respect to the conveyor route. The management apparatus 100 is an apparatus for managing the one or more image processing apparatuses 200. Each image processing apparatus 200 includes a discriminator for inspecting a workpiece. The discriminator included in the image processing apparatus 200 is a discriminator generated through machine learning, and inspects each workpiece by discriminating whether or not there is a detection target contained in an image captured from that workpiece as shown in FIG. 2. Hereinafter, a description will be given assuming that the detection target is a defect, but the defect is an example of a "detection target" of one or more embodiments, and one or more embodiments can be applied to any detection target without being limited defects. In this example, a defect is an anomaly in the workpieces, such as a scratch, unevenness in the color or the like, contamination, a dent, a chip, burring, foreign matter, blurred printing, printing misalignment, or the like. Note that the management apparatus 100 is an example of an "information processing apparatus" of one or more embodiments. Furthermore, the defect is an example of a "detection target" of one or more embodiments.

The management apparatus 100 includes the same or the same type of discriminator as the discriminator included in the image processing apparatus 200. Furthermore, the database of the management apparatus 100 stores image data for use in evaluation of the discrimination precision of the discriminator discriminating whether or not there is a defect (hereinafter, referred to as "evaluation data"). At this time, at least a predetermined number of pieces of evaluation data are stored in the database of the management apparatus 100 in association with each of a plurality of possible attributes of a workpiece.

In one or more embodiments, an attribute of a workpiece is expressed by an appearance-related feature of the workpiece, and, more specifically, it may be defined by one appearance-related feature of the workpiece or a combination of a plurality of features. Furthermore, an appearance-related feature of a workpiece may be expressed by, for example, a combination of aspects related to properties of the workpiece such as "surface shape", "reflectance", or "transparency", and aspects related to a level such as "low, medium, or high" or states such as "smooth", "rough", or "uneven". Specific examples of an appearance-related feature of a workpiece include "surface shape is smooth", "reflectance is high", "transparency is low", and the like. Furthermore, specific examples of an attribute of a workpiece include "appearance whose surface shape is smooth, surface reflectance is high, and transparency is low", "appearance whose surface shape is rough, surface reflectance is low, and transparency is low", and the like. An attribute of a workpiece is an example of an "attribute of an object" of one or more embodiments.

Furthermore, the database of the management apparatus 100 stores image data for additionally training a discriminator (hereinafter, referred to as "additional training data"). The management apparatus 100 can receive a plurality of pieces of image data captured from a workpiece from a user, and store them as additional training data in the database. At this time, attributes may be stored in the database in association with the additional training data, according to the attributes of the workpiece from which the images have been captured. At this time, if additional training data is generated based on images captured from workpieces having a plurality of attributes, such as workpieces in which part of the surface is glossy and the remaining portions are uneven, the additional training data may be associated with a plurality of attributes. Note that the additional training data is an example of "training data" of one or more embodiments.

Hereinafter, an operation of the image processing system 1 according to one or more embodiments will be roughly described. First, the management apparatus 100 additionally trains (re-trains) the discriminator included in the management apparatus 100, using additional training data. At this time, the management apparatus 100 evaluates, for each attribute, discrimination precisions of the discriminator before and after the additional training, using evaluation data associated with each of a plurality of possible attributes, and outputs, as an evaluation result, the discrimination precisions for each of the plurality of attributes before and after the additional training. If the evaluation result satisfies a predetermined condition or if a predetermined instruction is received from a user who sees the output evaluation result, the management apparatus 100 determines that the evaluation result is proper, and updates the discriminator included in the image processing apparatus 200 to the discriminator after the additional training.

According to one or more embodiments, a change in the discrimination precisions of a discriminator before and after additional training is evaluated using evaluation data associated with each of a plurality of attributes, so that objects for which a discrimination precision is improved and the other objects are quantitatively evaluated and output for each attribute of the objects. In this manner, if the influence range of additional training is provided to a user in a visible form, the user can see whether or not a discriminator that matches the user's purpose has been obtained through the additional training, before installing and operating the discriminator in the image processing apparatus 200. Accordingly, it is possible to prevent a discriminator not properly subjected to additional training from operating in the image processing apparatus 200 and consuming CPU resources or memory resources of the image processing apparatus 200 in vain.

Note that the additional training data may be divided into data for actual use in training of a discriminator (hereinafter, referred to as "additional training data (for training)") and data for use in evaluation of a trained discriminator (hereinafter, referred to as "additional training data (for testing)"). The evaluation data and the additional training data (for testing) differ from each other in that the former is image data pre-set in advance in the management apparatus 100 and the latter is image data prepared by a user.

Furthermore, the management apparatus 100 may evaluate discrimination precisions of a discriminator before and after additional training, using additional training data (for testing), and output the evaluation result in addition to the evaluation result of the discriminator using the evaluation data. As described above, additional training data is associated with at least one attribute, and thus additional training data (for testing), which is part of this data, is also associated with the at least one attribute. Accordingly, discrimination precisions for a workpiece having an attribute associated with additional training data can be quantitatively evaluated before and after training, and thus a user can more accurately see whether or not the discriminator has been trained to achieve a desired level of discrimination precision.

§ 2 Configuration Example

Hardware Configuration
Management Apparatus

Figure 3:
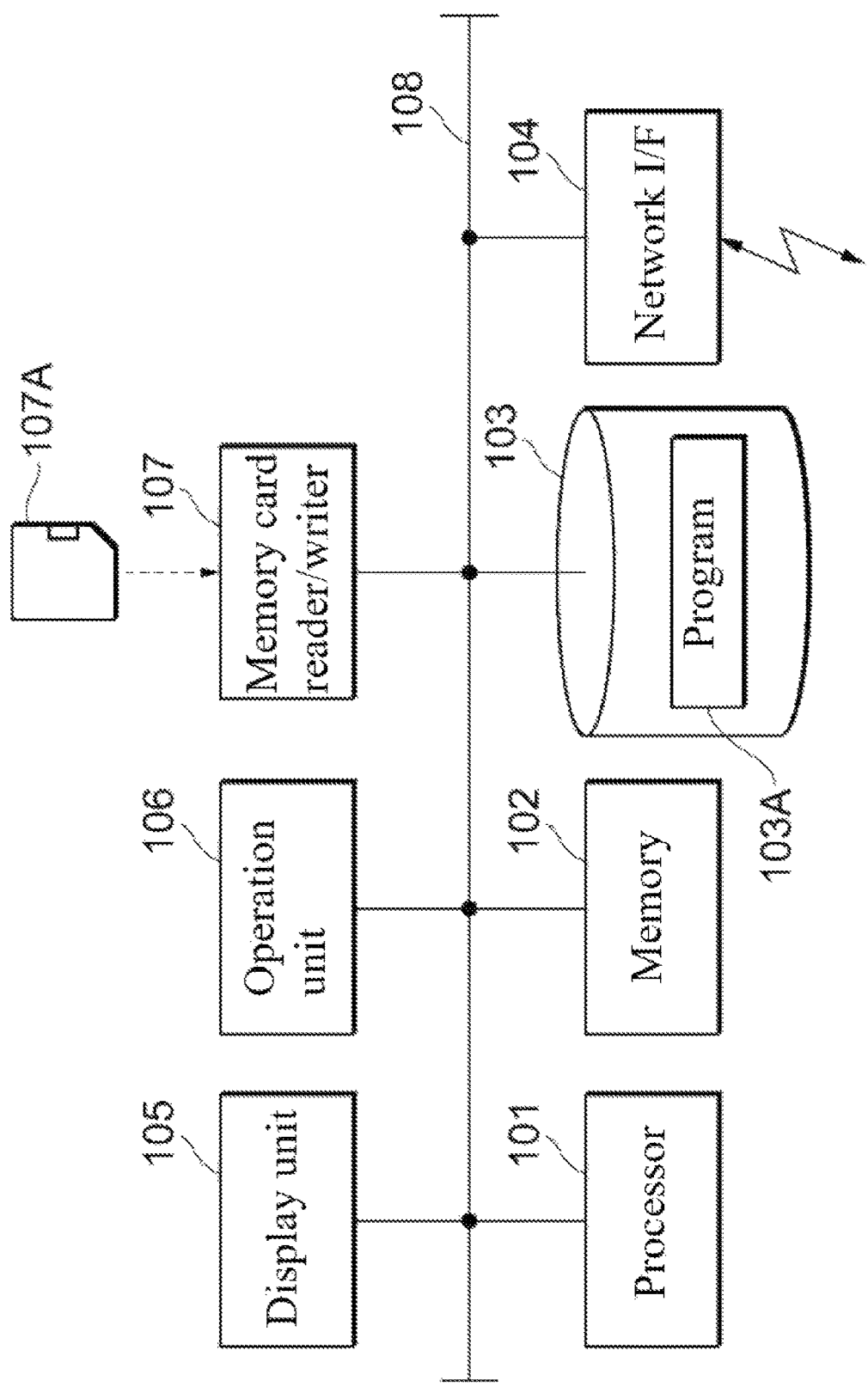
FIG. 3 is a diagram schematically illustrating an example of the hardware configuration of a management apparatus according to one or more embodiments.

Next, an example of the hardware configuration of the management apparatus 100 according to one or more embodiments will be described with reference to FIG. 3. FIG. 3 schematically shows an example of the hardware configuration of the management apparatus 100 according to one or more embodiments. In the example in FIG. 3, the management apparatus 100 may include a processor 101, a memory 102, a storage device 103 such as an HDD (hard disk drive), a network interface (I/F) 104, a display unit 105, an operation unit 106, and a memory card reader/writer 107. These units are communicably connected to each other via an internal bus 108.

The processor 101 realizes various functions of the management apparatus 100, by expanding a program (command code) 103A stored in the storage device 103 into the memory 102, and executing the program. The memory 102 and the storage device 103 store data respectively in a volatile and non-volatile manner. The storage device 103 stores the program 103A in addition to an OS (operating system).

The network interface 104 exchanges data with the image processing apparatus 200 via the network 2.

The display unit 105 displays various screens and the like realized by the processor 101 executing the program 103A. The display unit 105 is composed of, for example, a display screen such as an LCD (liquid crystal display).

The operation unit 106 receives a user operation, and outputs an internal command indicating the received operation to the processor 101 or the like. The operation unit 106 is composed of, for example, a keyboard, a mouse, a touch panel, a tablet, a speech recognition unit, or the like.

The memory card reader/writer 107 reads data from a storage medium 107A, and writes data to the storage medium 107A. The storage medium 107A is a medium that stores information such as a program through electrical, magnetic, optical, mechanical, or chemical actions such that the stored information such as a program can be read by computers or other devices or machines. The management apparatus 100 may acquire the program 103A from the storage medium 107A.

Image Processing Apparatus

Figure 4:
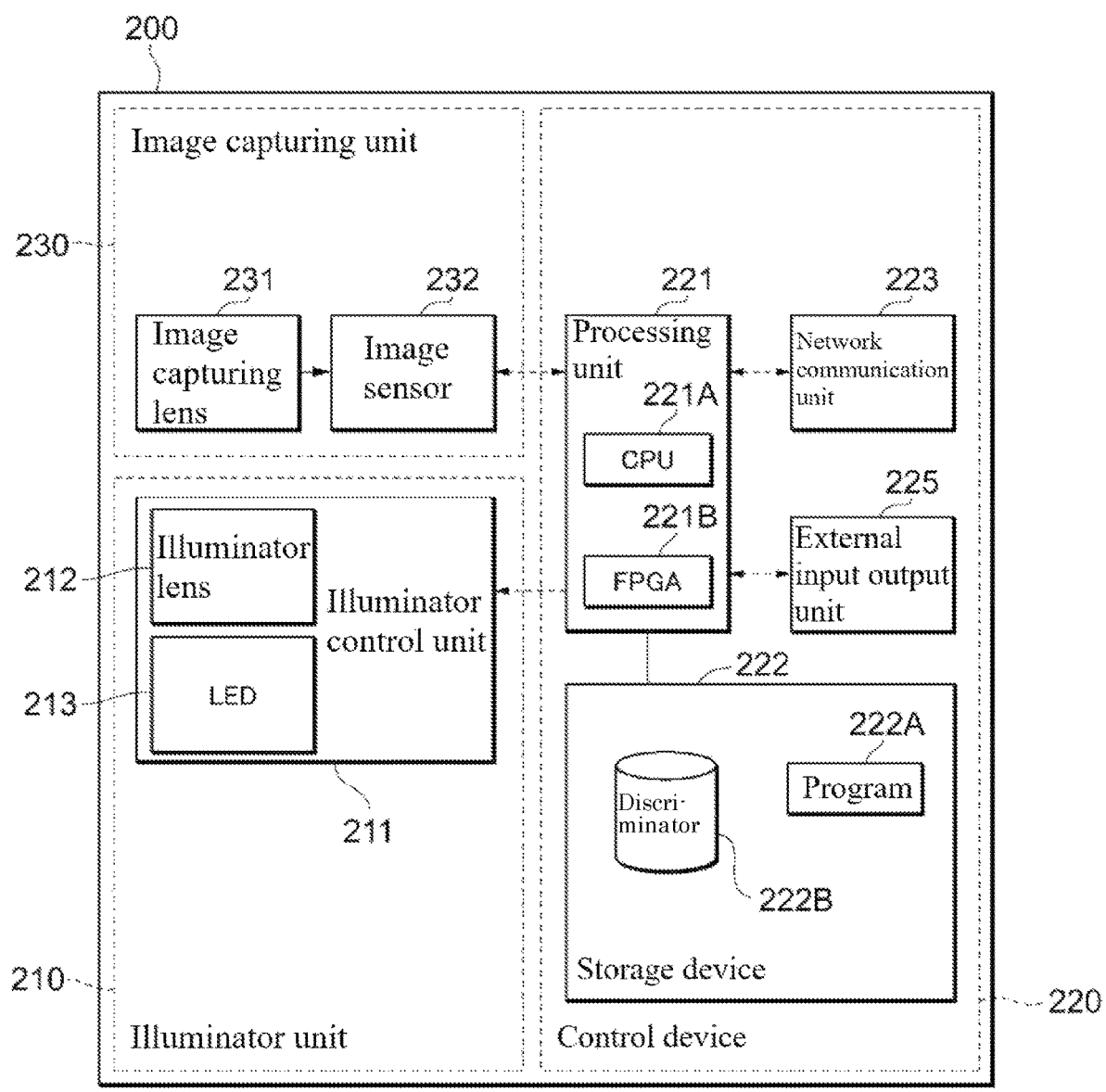
FIG. 4 is a diagram schematically illustrating an example of the hardware configuration of an image processing apparatus according to one or more embodiments.

Next, an example of the hardware configuration of the image processing apparatus 200 according to one or more embodiments will be described with reference to FIG. 4. FIG. 4 schematically shows an example of the hardware configuration of the image processing apparatus 200 according to one or more embodiments. In the example in FIG. 4, the image processing apparatus 200 may include an illuminator unit 210, a control device 220, and an image capturing unit 230.

The illuminator unit 210 irradiates a workpiece that is an object to be inspected, with light necessary to capture the image. That is to say, the illuminator unit 210 irradiates an image capturing range of the image capturing unit 230 with light. More specifically, the illuminator unit 210 includes a plurality of illuminator control units 211 provided on an illuminator board. These units are arranged on the illuminator board. Each illuminator control unit 211 includes an illuminator lens 212 and an LED 213. The illuminator control unit 211 irradiates a workpiece with light in accordance with a command from the control device 220. More specifically, light generated by the LED 213 is emitted via the illuminator lens 212 onto the workpiece.

The image capturing unit 230 outputs an image signal upon receiving reflect light emitted from the illuminator unit 210. The image signal is transmitted to the control device 220. More specifically, the image capturing unit 230 includes an image sensor 232 partitioned into a plurality of pixels such as a CCD (charge coupled device) or a CMOS (complementary metal oxide semiconductor) image sensor, in addition to an optical system such as an image capturing lens 231.

The control device 220 controls the entire image processing apparatus 200. That is to say, the control device 220 controls the illuminator unit 210 and the image capturing unit 230, and performs image processing based on the image signal from the image capturing unit 230. More specifically, the control device 220 includes a processing unit 221, a storage device 222, and a network communication unit 223.

The processing unit 221 is composed of an integrated circuit such as a CPU 221A or an FPGA 221B. Alternatively, the processing unit 221 may be composed of a DSP, GPU, an ASIC (application specific integrated circuit), or other integrated circuits.

The storage device 222 includes a non-volatile storage device such as a ROM (read only memory), a flash memory, an HDD, or an SSD (solid state drive), and/or a non-volatile memory such as a RAM (random access memory). Typically, the processing unit 221 realizes various types of image processing of the image processing apparatus 200, by executing a program (command code) 222A stored in the storage device 222. Furthermore, the storage device 222 stores a discriminator 222B. The program 222A describes a program for inspecting a workpiece by executing the discriminator 222B, and the processing unit 221 inspects a workpiece by executing the discriminator 222B based on an instruction of the program 222A.

The network communication unit 223 is an interface for exchanging data with the management apparatus 100 via the network 2. More specifically, the network communication unit 223 uses a configuration compliant with the Ethernet (registered trademark) or the like.

Functional Configuration

Management Apparatus

Figure 5:
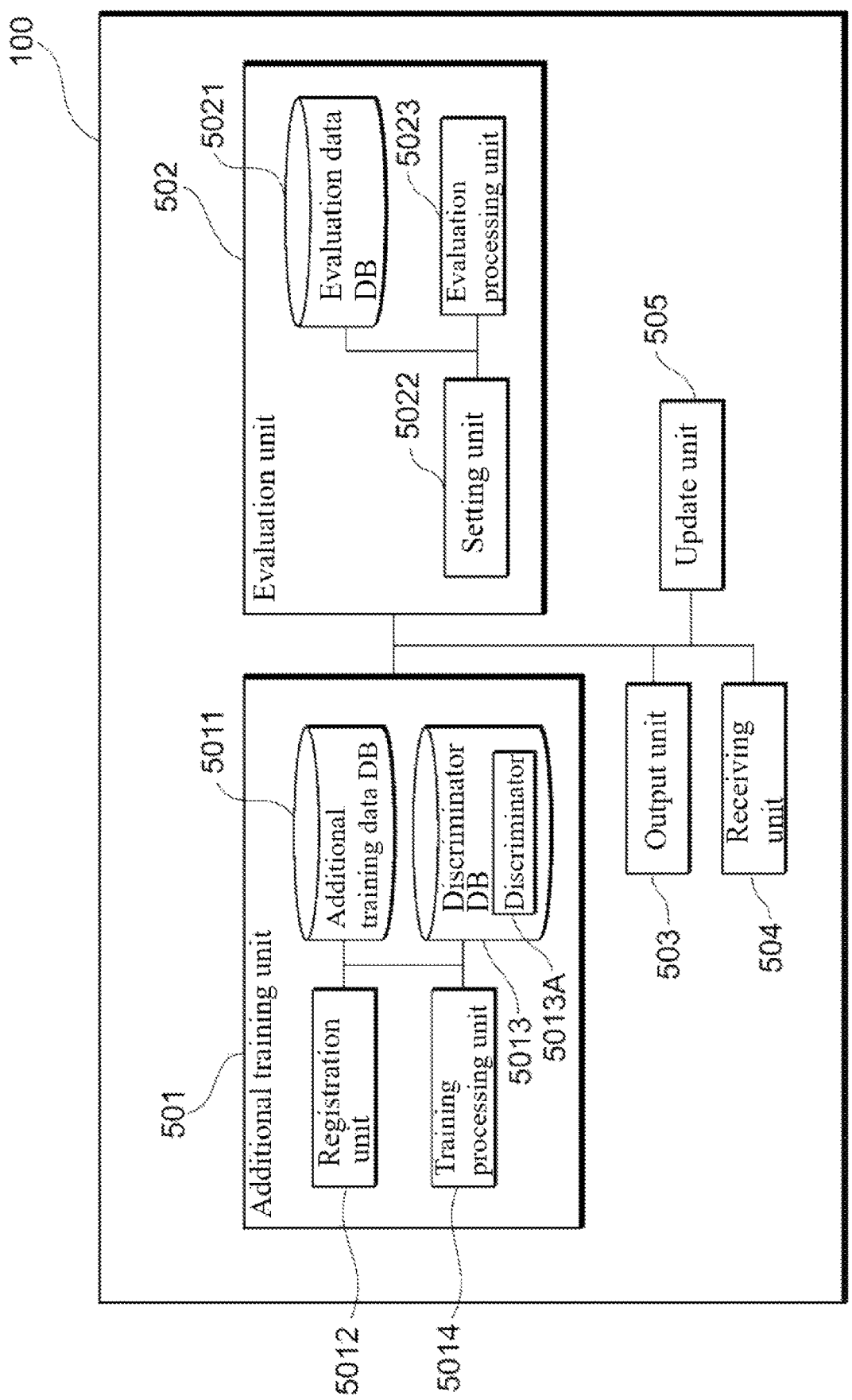
FIG. 5 is a diagram schematically illustrating an example of the functional configuration of the management apparatus according to one or more embodiments.

Next, an example of the functional configuration of the management apparatus 100 according to one or more embodiments will be described with reference to FIG. 5. FIG. 5 schematically shows an example of the functional configuration of the management apparatus 100 according to one or more embodiments.

An additional training unit 501 is a processing unit configured to perform processing related to additional training, and includes an additional training data DB (database) 5011, a registration unit 5012, a discriminator DB 5013 and a training processing unit 5014. The additional training data DB 5011 stores additional training data. The additional training data DB 5011 is an example of a "third storage unit" of one or more embodiments. The discriminator DB 5013 stores a discriminator 5013A. The discriminator DB 5013 is, for example, an example of a "first storage unit" of one or more embodiments.

The registration unit 5012 stores additional training data into the additional training data DB 5011. Specifically, the registration unit 5012 receives a plurality of images related to a workpiece from a user, and registers them as additional training data into the additional training data DB 5011. At this time, some of the received plurality of images may be registered as additional training data (for training) and the remaining images may be registered as additional training data (for testing) into the additional training data DB 5011. Furthermore, designation of an attribute associated with the training data (at least one of the plurality of attributes associated with the evaluation data) may be received from a user, and the designated attribute may be registered into the additional training data DB 5011 in association with the additional training data. The registration unit 5012 may be referred to as a "receiving unit" because it performs processing of receiving designation of an attribute from a user.

The discriminator 5013A is a discriminator generated by performing training processing and evaluation processing on a machine learning model. A machine learning model is a model having a predetermined model structure and a processing parameter that changes in accordance with training processing, and improves the level of precision of a recognition result by optimizing the processing parameter based on experiences obtained from training data. That is to say, the discriminator 5013A of one or more embodiments more specifically includes a so-called "trained model", which is a combination of a predetermined model structure and optimized processing parameters. As an algorithm of the machine learning model, for example, support vector machines, logistic regression, neural networks, deep neural networks, or the like may be used, but there is no particular limitation to these.

The training processing unit 5014 performs processing of additionally training the discriminator 5013A using additional training data (for training).

An evaluation unit 502 is a processing unit configured to evaluate the discriminator 5013A, and includes an evaluation data DB 5021, a setting unit 5022, and an evaluation processing unit 5023. The evaluation data DB 5021 stores evaluation data. The evaluation data DB 5021 is, for example, an example of a "second storage unit" of one or more embodiments.

The setting unit 5022 receives settings of an attribute that is an evaluation target (hereinafter, referred to as an "evaluation target attribute"), from a user, when evaluating the additionally trained discriminator 5013A. Furthermore, the setting unit 5022 receives settings of the number of pieces of evaluation data (the number of images) for use in evaluation processing by a discriminator, among the evaluation data associated with the evaluation target attribute, from a user.

The evaluation processing unit 5023 evaluates, for each attribute, the discrimination precision of the discriminator 5013A before additional training of the discriminator 5013A and the discrimination precision of the discriminator 5013A after additional training of the discriminator 5013A, using the evaluation data. Note that, if evaluation target attributes are set, the evaluation processing unit 5023 evaluates, for each attribute contained in the evaluation target attributes, the discrimination precisions before and after the additional training. On the other hand, if no evaluation target attribute is set, the evaluation processing unit 5023 evaluates, for all attributes, discrimination precisions before and after the additional training. The evaluation processing unit 5023 may evaluate the discrimination precisions before and after the additional training, for an attribute designated by a user and received by the registration unit 5012.

Furthermore, if the number of pieces of evaluation data for use in evaluation of the discriminator 5013A is set by the setting unit 5022, the evaluation processing unit 5023 evaluates the discriminator 5013A using the set number of pieces of evaluation data. Note that the evaluation processing unit 5023 may evaluate the discrimination precision of the discriminator 5013A, further using the additional training data (for testing).

An output unit 503 performs processing of outputting the discrimination precisions of the discriminator 5013A for each attribute before and after additional training of the discriminator 5013A, which are an evaluation result by the evaluation unit 502, to the display unit 105. The output unit 503 outputs the discrimination precisions such that the attributes associated with the additional training data are identifiable, when outputting the discrimination precisions of the discriminator 5013A for each attribute.

A receiving unit 504 performs processing of receiving an instruction as to whether or not to update the discriminator 222B included in the image processing apparatus 200 to the additionally trained discriminator 5013A, from a user.

An update unit 505 performs processing of updating the discriminator 222B included in the image processing apparatus 200 to the additionally trained discriminator 5013A. Note that the update includes processing that transmits the model structure and the processing parameter of the additionally trained discriminator 5013A to the image processing apparatus 200, thereby activating the additionally trained discriminator 5013A in the image processing apparatus 200.

The update unit 505 may update the discriminator 222B included in the image processing apparatus 200 to the additionally trained discriminator 5013A, if, among the discrimination precisions for the attributes evaluated using the evaluation data, the discrimination precision for an attribute associated with the additional training data is higher after the additional training than before the additional training. Furthermore, the update unit 505 may update the discriminator 222B included in the image processing apparatus 200 to the additionally trained discriminator 5013A, if the discrimination precision evaluated using the additional training data (for testing) is higher after the additional training than before the additional training, and, among the discrimination precisions for the attributes evaluated using the evaluation data, the discrimination precision for an attribute associated with the additional training data (for training) is higher after the additional training than before the additional training. Furthermore, the update unit 505 may update the discriminator 222B included in the image processing apparatus 200 to the discriminator 5013A additionally trained by the training processing unit 5014, if an instruction to update the discriminator is received by the receiving unit 504.

Image Processing Apparatus

Figure 6:
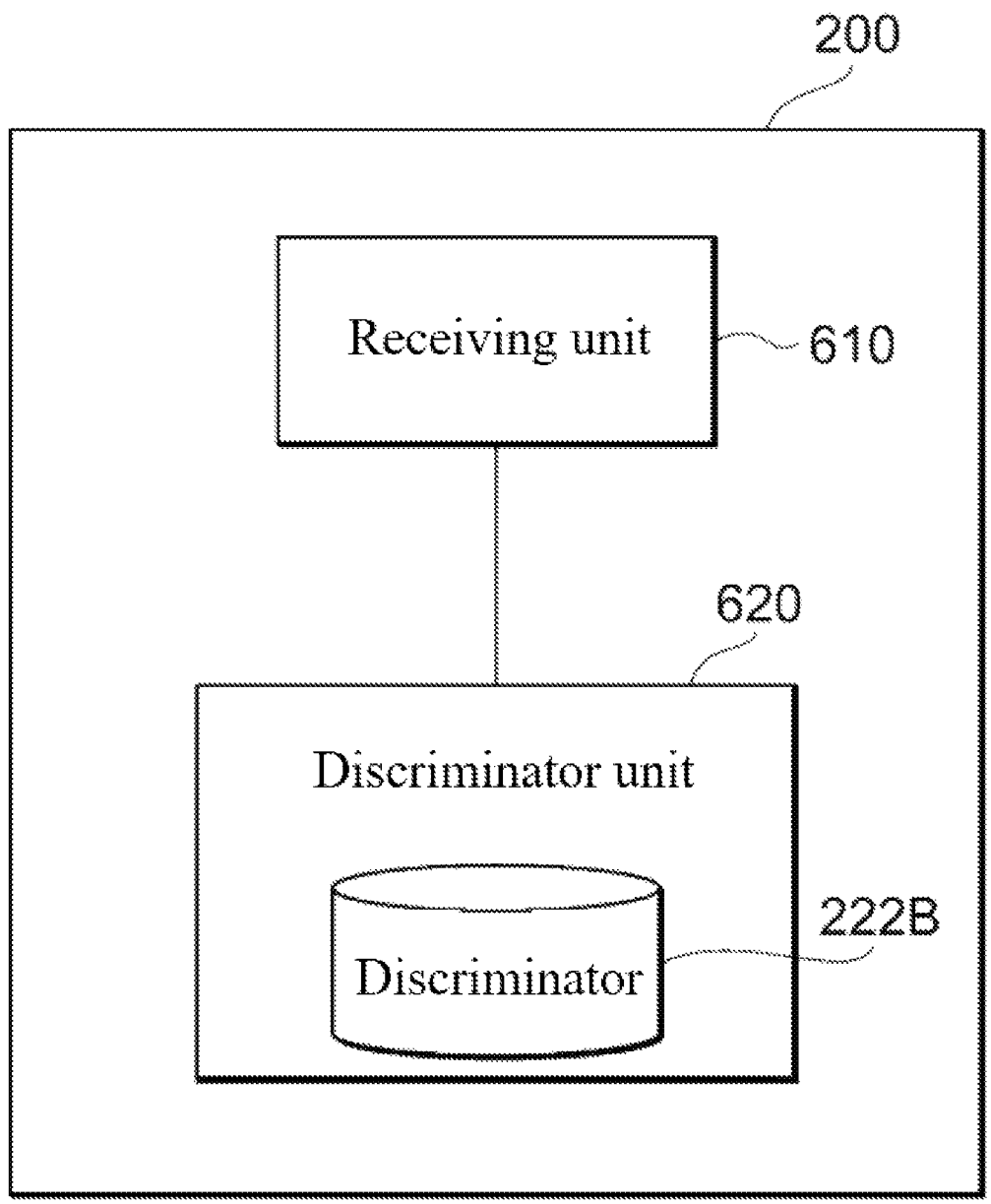
FIG. 6 is a diagram schematically illustrating an example of the functional configuration of the image processing apparatus according to one or more embodiments.

FIG. 6 schematically shows an example of the functional configuration of the image processing apparatus 200 according to one or more embodiments. A receiving unit 610 receives settings of the discriminator 5013A additionally trained by the management apparatus 100, from the management apparatus 100, and stores them as the discriminator 222B in the storage device 222. A discriminator unit 620 discriminates whether or not there is a defect contained in a workpiece whose image has been captured by the image capturing unit 230, using the discriminator 222B stored in the storage device 222.

Other Considerations

In one or more embodiments, an example has been described in which all functions of the management apparatus 100 are realized by the processor 101. However, some or all of the functions may be realized by one or a plurality of dedicated processors or the like. Furthermore, the functions of the image processing apparatus 200 in each functional configuration may be omitted, replaced, or added as appropriate according to one or more embodiments.

§ 3 Operation Example

Next, an operation example of the management apparatus 100 will be described. The processing procedure described below is merely an example, and the processes may be changed to the extent possible. Furthermore, steps in the processing procedure described below may be omitted, replaced, or added as appropriate according to one or more embodiments.

Outline of Processing Procedure

Figure 7:
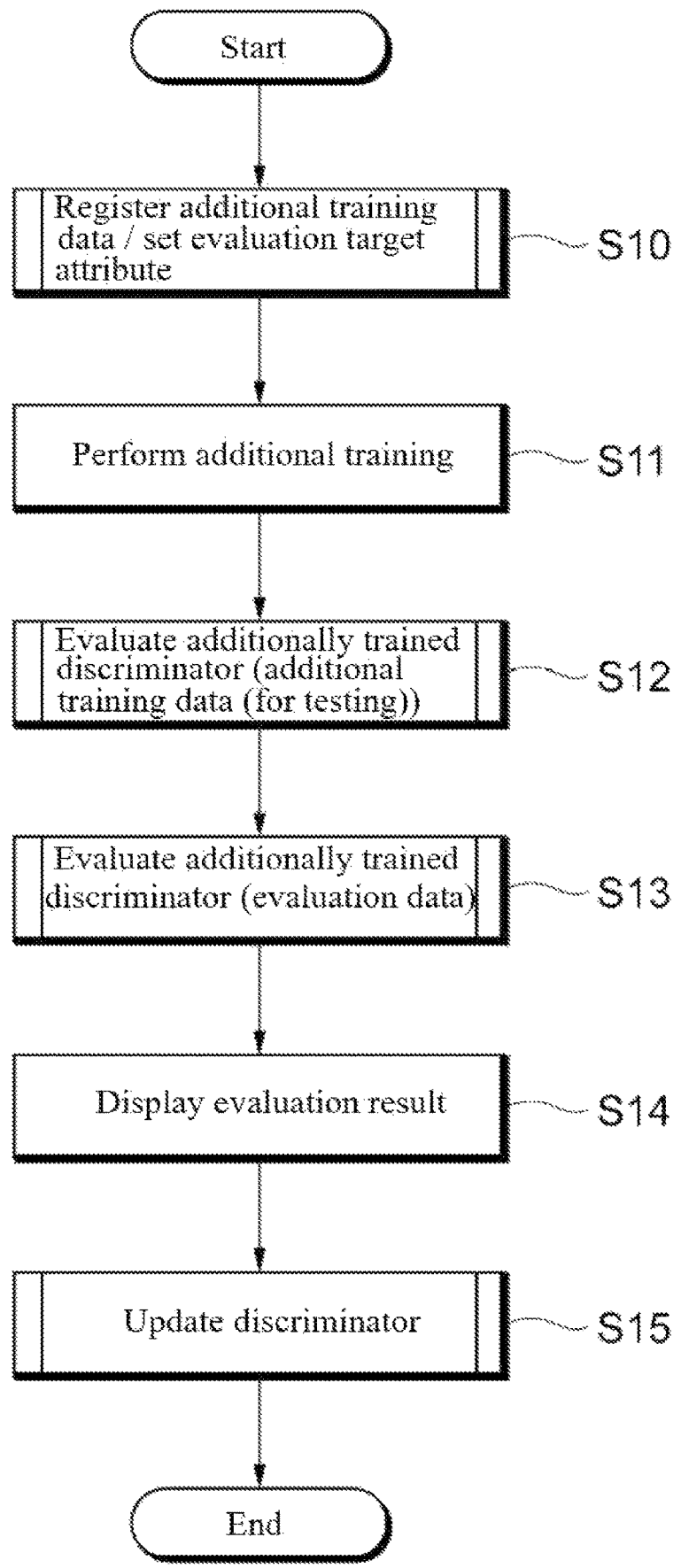
FIG. 7 is a diagram illustrating an example of the processing procedure performed by the management apparatus.

FIG. 7 is a flowchart showing an example of the processing procedure performed by the management apparatus 100. First, the registration unit 5012 receives additional training data and designation of its attribute from a user, and stores the received additional training data into the additional training data DB 5011 in association with the designated attribute. Furthermore, the setting unit 5022 receives settings of an evaluation target attribute from the user (S10). Subsequently, the training processing unit 5014 additionally trains the discriminator 5013A using additional training data (for training) (S11). Subsequently, the evaluation processing unit 5023 evaluates the discriminator 5013A on which the additional training has been completed, using the additional training data (for testing) (S12). This evaluation is also referred to as validation. Furthermore, the evaluation processing unit 5023 evaluates, for each attribute, the discriminator 5013A on which the additional training has been completed, using the evaluation data (S13). Subsequently, the evaluation processing unit 5023 displays an evaluation result obtained by evaluating the discriminator 5013A, on the display unit 105 (S14). Subsequently, the update unit 505 updates the discriminator 222B included in the image processing apparatus 200 to the discriminator 5013A after the additional training (S15).

Figure 8:
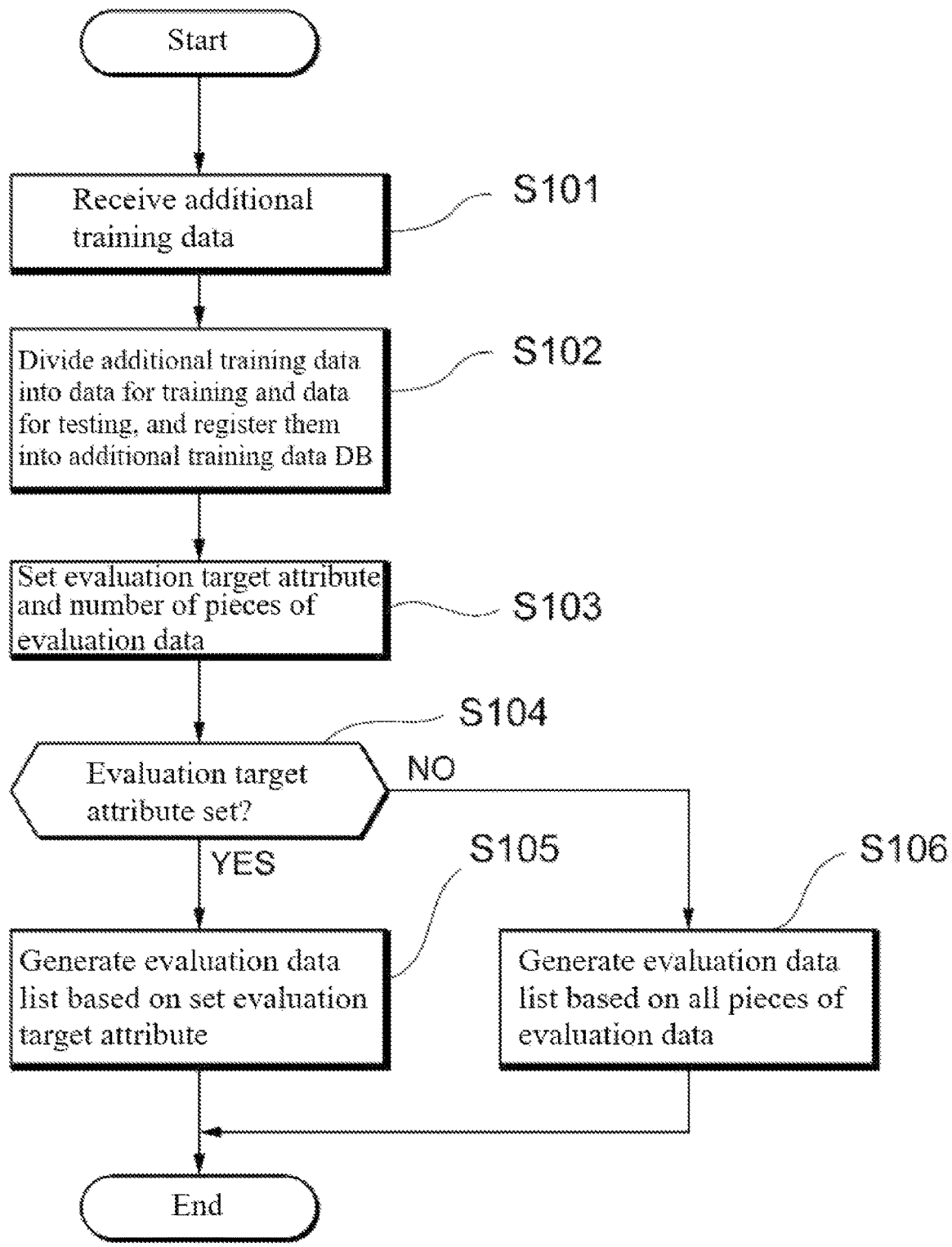
FIG. 8 is a diagram illustrating an example of the processing procedure for registering additional training data and setting evaluation target attributes.

Registration of Additional Training Data, and Settings of Evaluation Target Attribute FIG. 8 is a flowchart showing an example of the processing procedure for registering additional training data and setting evaluation target attribute. Hereinafter, the processing procedure of step S10 in FIG. 7 will be described in detail with reference to FIG. 8.

First, the registration unit 5012 receives additional training data and designation of its attribute from a user (S101). The additional training data may be image data prepared by a user capturing an image of a workpiece or the like, or may be image data generated by a user using a screen or the like for generating additional training data, included in the management apparatus 100. The additional training data may include defect-containing image data (image data that is to be recognized as containing a defect) and non-defect-containing image data (image data that is not to be recognized as containing a defect). The defect-containing image data refers to, for example, image data containing a defect such as a size or shape that is to be recognized as being defective. The non-defect-containing image data refers to, for example, both image data containing no defect, and image data containing a defect such as a size or shape that is not to be recognized as being defective (i.e., that cannot be regarded as a defect).

The registration unit 5012 may display a screen that allows a user to designate attributes that are to be associated with the additional training data, on the display unit 105.

Figures 9A, 9B:
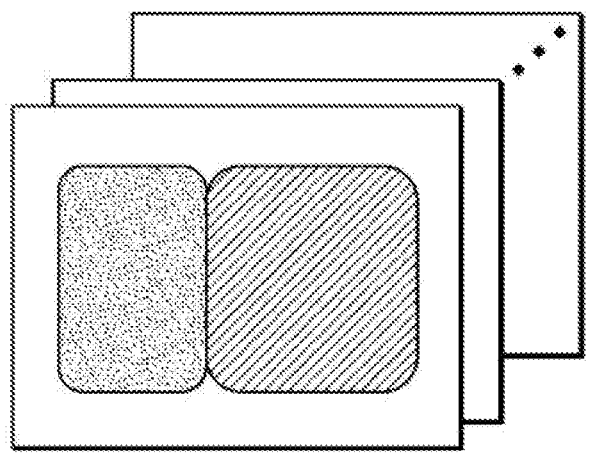
FIGS. 9A and 9B are diagrams each illustrating an example of additional training data and an attribute designation screen.

FIG. 9A shows an example of additional training data, and FIG. 9B shows an example of an attribute designation screen. For example, as shown in FIG. 9A, it is assumed that a user tries to register, as additional training data, images of workpieces, part of which has an attribute "surface shape is smooth, surface reflectance is high, and transparency is low" and the remaining portions have an attribute "surface shape is rough, surface reflectance is low, and transparency is low". At this time, the user selects the fields "additional training data" (fields that show "○" in FIG. 9B) in the line "surface shape: smooth", "reflectance: high", and "transparency: low" and the line "surface shape: rough", "reflectance: low", and "transparency: low" on the attribute designation screen, thereby designating that the additional training data has attributes associated with these lines. The registration unit 5012 changes the display of the fields "additional training data" in the lines selected on the attribute designation screen from "-" to "○", and interprets that the attributes associated with these lines are attributes associated with the additional training data.

Subsequently, the registration unit 5012 divides the additional training data into additional training data (for training) and additional training data (for testing), and registers them into the additional training data DB 5011 in association with the attributes designated in the processing procedure in step S101. At this time, the registration unit 5012 may register additional training data (for training) and additional training data (for testing) into the additional training data DB 5011 in association with the attributes designated on the attribute designation screen (S102). The dividing method may be any method, but, for example, the registration unit 5012 may divide the additional training data based on an instruction from the user, or may divide the additional training data at random.

Subsequently, the setting unit 5022 receives settings of evaluation target attributes. At this time, settings of the number of pieces of evaluation data for use in evaluation of the discriminator 5013A may be received from the user (S103). The setting unit 5022 may display a screen for receiving settings of evaluation target attributes from the user, and a screen for receiving settings of the number of pieces of evaluation data for use in evaluation, on the display unit 105, and allow the user to designate an evaluation target attribute and the number of pieces of data for use in the evaluation for each evaluation target attribute, on the screen. Alternatively, the setting unit 5022 may set evaluation target attributes based on a predetermined rule. The predetermined rule may be, for example, a rule that sets attributes associated with the additional training data and attributes similar to these attributes to evaluation target attributes. Information regarding what attributes are similar to each other may be defined in advance in a setting file or the like. Furthermore, if at least some of a plurality of features constituting attributes are similar to each other, it may be determined that the attributes are similar to each other. Note that evaluation target attributes are optionally set, and the processing procedure in step S103 may be omitted according to an instruction from the user.

FIGS. 10A and 10B show an example of a screen for receiving settings of the number of pieces of evaluation data for use in evaluation of the discriminator 5013A. FIG. 10A shows an example of the number of pieces of data in an initial state. "Number of pieces of evaluation data" shows the initial value of the number of pieces of evaluation data (100 pieces of data in the example in FIG. 10A) for use in evaluation of the discriminator 5013A. "Total number of pieces of data" shows the number of pieces of evaluation data stored in the evaluation data DB, for each attribute. Note that, if the number of pieces of evaluation data is set to be smaller than the total number of pieces of data, the evaluation processing unit 5023 may select at random evaluation data for actual use in evaluation, from the pieces of evaluation data stored in the evaluation data DB.

FIG. 10B shows an example of a case in which a user changes the number of pieces of evaluation data for use in evaluation of the discriminator 5013A. The user can freely change, for each attribute, the number of pieces of evaluation data within the range of the total number of pieces of data. Note that, in the example in FIG. 10B, the total number of pieces of data of the attribute "surface shape: rough", "reflectance: low", and "transparency: low" increases from 1000 to 3000. This indicates that new evaluation data is additionally registered into the evaluation data DB according to an instruction from a user. The additionally registered evaluation data may be evaluation data freely generated by a user, or may be additional training data (for testing) previously used for additional training. Furthermore, new evaluation data may be acquired via a network from cloud services, predetermined servers, or the like.

Accordingly, for example, the user can precisely evaluate the discriminator 5013A after the additional training, by increasing the number of pieces of evaluation data for attributes associated with the additional training data or attributes whose discrimination precision the user wants to prevent from deteriorating, compared with the number of pieces of evaluation data for the other attributes. Furthermore, the user can shorten the time necessary to evaluate the discriminator 5013A using the evaluation data, by reducing the number of pieces of evaluation data for attributes whose discrimination precision may be allowed to deteriorate without any problem.

Subsequently, the evaluation processing unit 5023 checks whether or not an evaluation target attribute has been set in step S104 (S104). If an evaluation target attribute has been set, the procedure advances to step S105, and, if not, the procedure advances to step S106.

Subsequently, the evaluation processing unit 5023 generates an evaluation data list based on all pieces of evaluation data associated with the evaluation target attribute set in step S104 (S105). The evaluation data list may be, for example, a list file in which, for all pieces of evaluation data for use in evaluation of the discriminator 5013A, an attribute corresponding to each piece of evaluation data and a specific data name (file name) are listed.

Subsequently, the evaluation processing unit 5023 generates an evaluation data list based on all pieces of evaluation data stored in the evaluation data DB (S106). The evaluation data list generated in the processing procedure in step S106 may be a list file in which, for all pieces of evaluation data stored in the evaluation data DB, an attribute corresponding to each piece of evaluation data and a specific data name (file name) are listed.

Evaluation of Discriminator Using Additional Training Data (for Testing)

Figure 11:
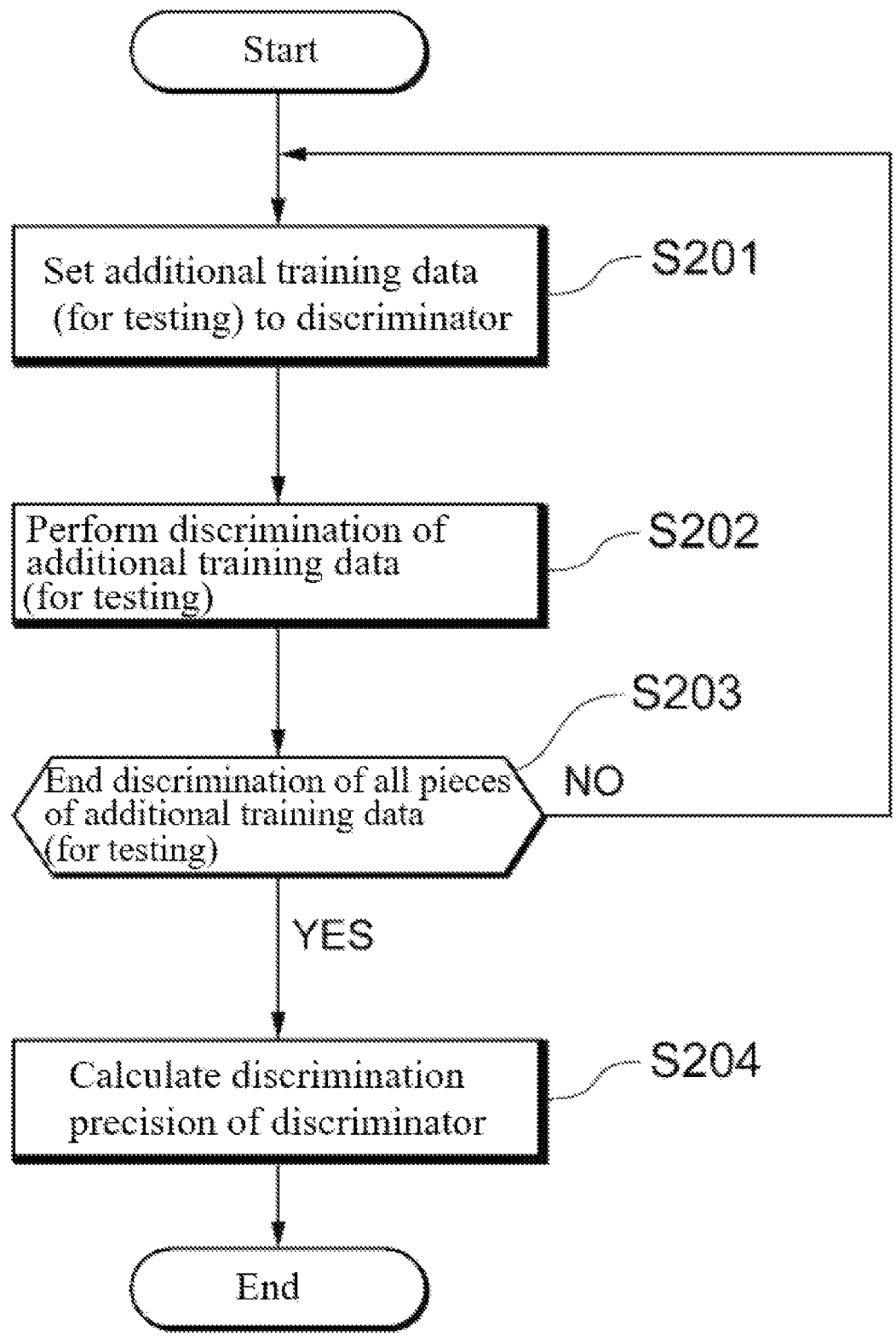
FIG. 11 is a diagram illustrating an example of the processing procedure for evaluating a discriminator using additional training data (for training).

FIG. 11 is a flowchart showing an example of the processing procedure for evaluating a discriminator using additional training data (for training). Hereinafter, the processing procedure in step S12 in FIG. 7 will be described in detail with reference to FIG. 11.

First, the evaluation processing unit 5023 sets any one piece of additional training data (for testing) among the pieces of additional training data (for testing) acquired from the additional training data DB, to the discriminator 5013A before the additional training and the discriminator 5013A after the additional training (S201), and causes the discriminator 5013A before the additional training and the discriminator 5013A after the additional training to discriminate the set additional training data (for testing) (S202). The evaluation processing unit 5023 stores the discrimination result. Subsequently, the evaluation processing unit 5023 performs the processing procedure in steps S201 and S202 on all pieces of additional training data (for testing), and, if discrimination on all pieces of additional training data (for testing) is ended, the processing procedure advances to step S204 (S203).

Subsequently, the evaluation processing unit 5023 calculates a discrimination precision of the discriminator 5013A in both the discriminator 5013A before the additional training and the discriminator 5013A after the additional training, using the discrimination result for each piece of additional training data (for testing) obtained in the processing procedure in steps S201 to S203 (S204). In this example, the discrimination precision may be, more specifically, the above-described accuracy and/or defect recognition.

Evaluation of Discriminator Using Evaluation Data

Figure 12:
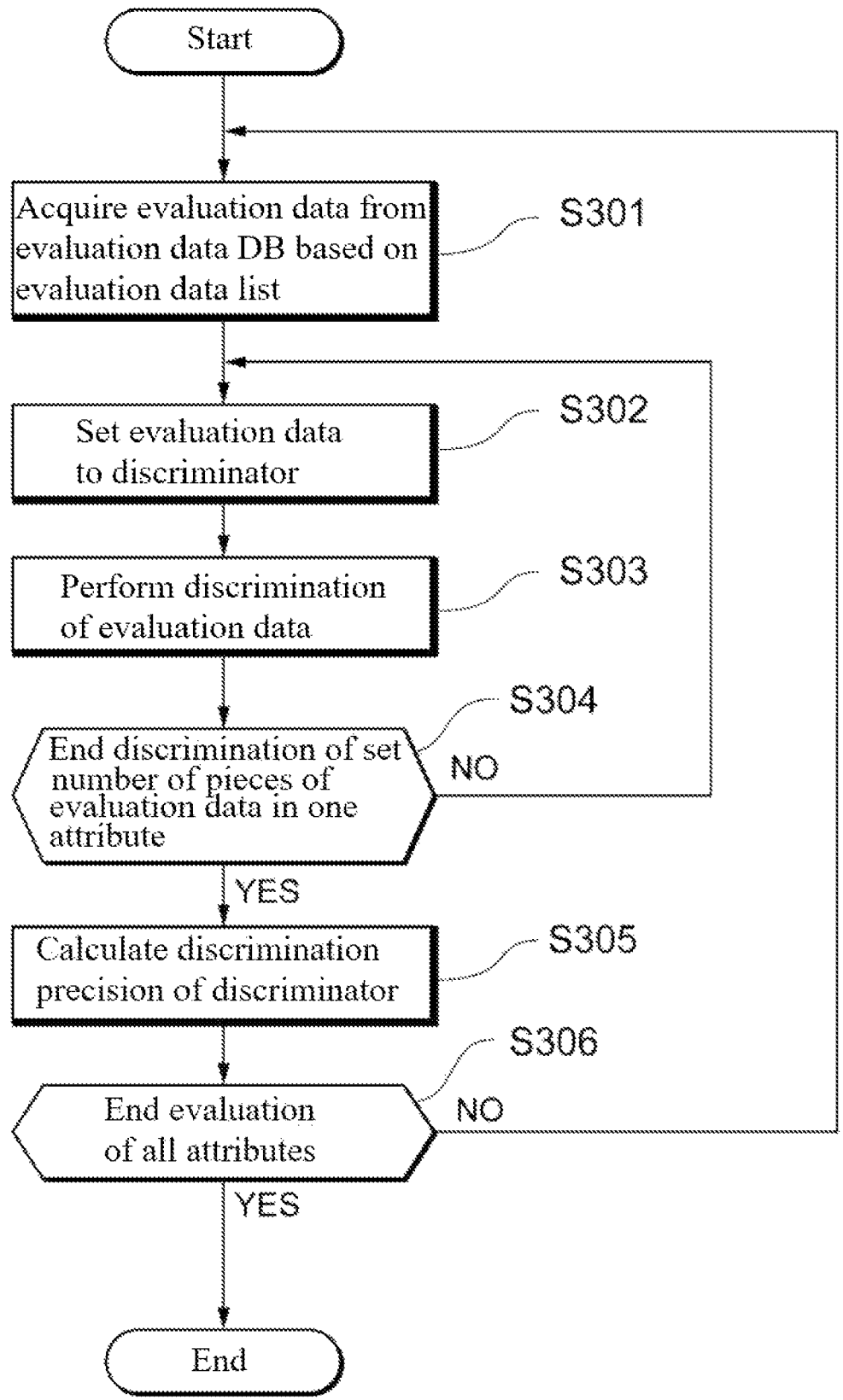
FIG. 12 is a diagram illustrating an example of the processing procedure for evaluating a discriminator using evaluation data.

FIG. 12 is a flowchart showing an example of the processing procedure for evaluating a discriminator using evaluation data. Hereinafter, the processing procedure in step S13 in FIG. 7 will be described in detail with reference to FIG. 12.

First, the evaluation processing unit 5023 refers to the evaluation data list, and selects any one attribute from the plurality of attributes stored in the evaluation data list. Subsequently, the evaluation processing unit 5023 acquires evaluation data corresponding to the selected attribute, from the evaluation data DB (S301).

Subsequently, the evaluation processing unit 5023 sets any one piece of evaluation data among the pieces of evaluation data acquired from the evaluation data DB, to the discriminator 5013A before the additional training and the discriminator 5013A after the additional training (S302), and causes the discriminator 5013A before the additional training and the discriminator 5013A after the additional training to discriminate the set evaluation data (S303). The evaluation processing unit 5023 stores the discrimination result. Subsequently, the evaluation processing unit 5023 performs the processing procedure in steps S302 and S303 on the evaluation data acquired from the evaluation data DB in the processing procedure in step S301, and, if discrimination on the set number of pieces of evaluation data is ended, the processing procedure advances to step S305 (S304).

Subsequently, the evaluation processing unit 5023 calculates a discrimination precision of the discriminator 5013A in both the discriminator 5013A before the additional training and the discriminator 5013A after the additional training, using the discrimination result for each piece of evaluation data obtained in the processing procedure in steps S302 to S304 (S305). In this example, the discrimination precision may be, more specifically, the above-described accuracy and/or defect recognition.

The accuracy is a proportion of evaluation data in which the discriminator 5013A accurately discriminates whether or not there is a defect, with respect to the pieces of evaluation data discriminated by the discriminator 5013A. Specifically, the accuracy is a proportion obtained by dividing the total of "number of pieces of evaluation data discriminated as containing a defect with respect to defect-containing evaluation data" and "number of pieces of evaluation data discriminated as not containing a defect with respect to non-defect-containing evaluation data", by "number of pieces of evaluation data discriminated by the discriminator 5013A".

Furthermore, the defect recognition is a proportion of evaluation data in which the discriminator 5013A accurately discriminates that a defect is contained, with respect to the pieces of defect-containing evaluation data discriminated by the discriminator 5013A. Specifically, the defect recognition is a proportion obtained by dividing "number of pieces of evaluation data discriminated as containing a defect with respect to defect-containing evaluation data", by "number of pieces of defect-containing evaluation data discriminated by the discriminator 5013A".

Subsequently, the evaluation processing unit 5023 performs the processing procedure in steps S301 to S305 on all attributes corresponding to the attribute of each piece of evaluation data stored in the evaluation data list, and, if calculation of a discrimination precision of the discriminator 5013A for all attributes is ended, the processing is ended (S306). Furthermore, for some attributes, a discrimination precision may be calculated for each attribute.

FIGS. 13A and 13B show an example of a screen for displaying an evaluation result. FIG. 13A is an example of a screen for displaying an evaluation result according to evaluation data. Note that, if an evaluation target attribute has been set in the processing procedure in step S103 in FIG. 8, the screen shown in FIG. 13A displays an evaluation result (discrimination precisions before the additional training and after the additional training) for each attribute contained in the set evaluation target attributes. On the other hand, if no evaluation target attribute has been set, the screen shown in FIG. 13A displays an evaluation result for all attributes. FIG. 13B is an example of a screen for displaying an evaluation result according to additional training data (for testing). The user can see whether or not the discrimination precision of the discriminator 5013A has been improved for attributes associated with the additional training data, by referring to the screen in FIG. 13A, and can also see a change in the discrimination precision of the discriminator 5013A for attributes not associated with the additional training data. Furthermore, the user can see whether or not the discrimination precision of the discriminator 5013A has been improved through the additional training, by referring to the screen in FIG. 13B.

Update of Discriminator

Figure 14:
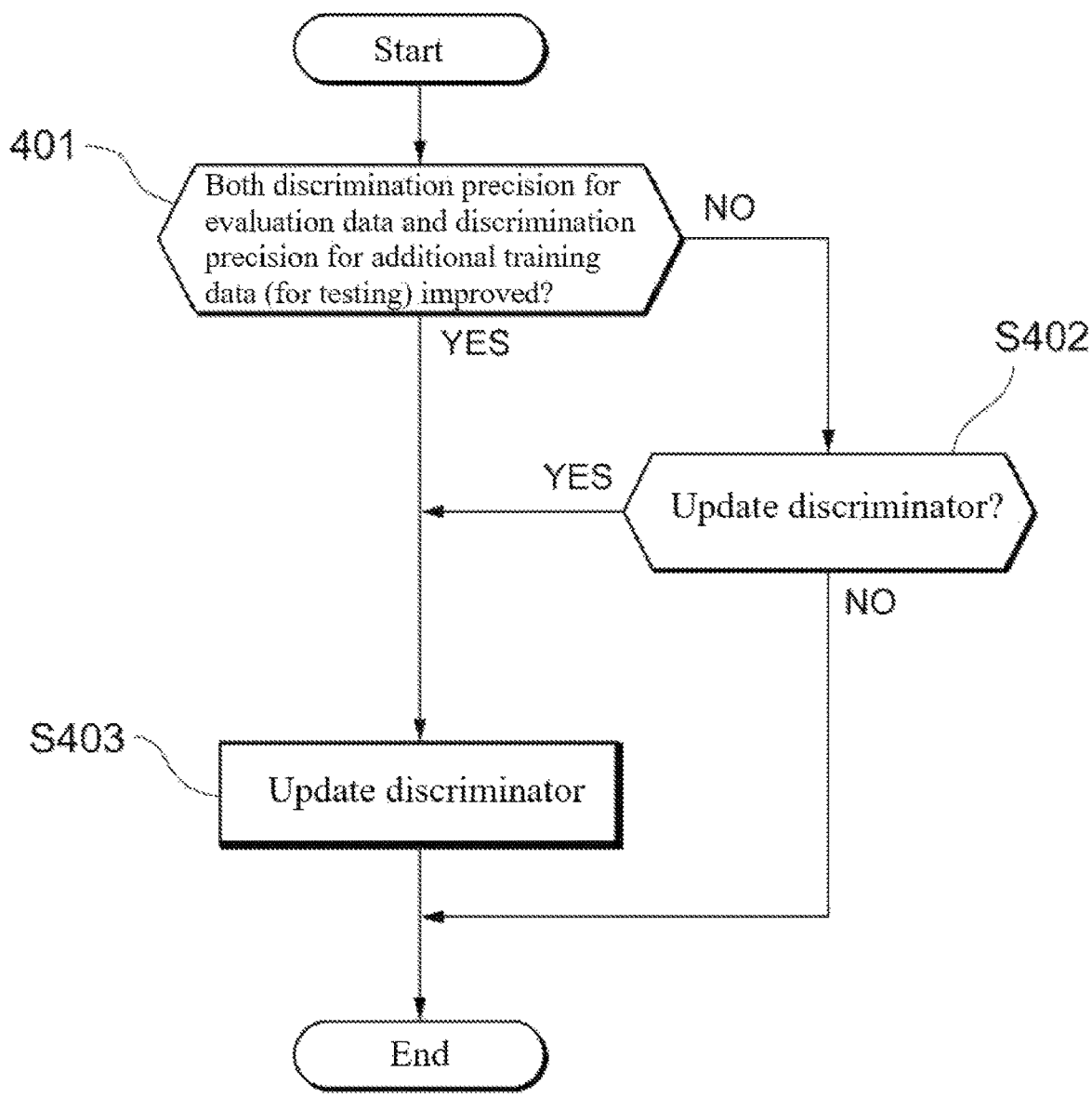
FIG. 14 is a diagram illustrating an example of the processing procedure for updating a discriminator.

FIG. 14 is a flowchart showing an example of the processing procedure for updating a discriminator. Hereinafter, the processing procedure in step S15 in FIG. 7 will be described in detail with reference to FIG. 14. First, the evaluation processing unit 5023 at least determines whether or not both the discrimination precision calculated using the evaluation data associated with an attribute of the additional training data and the discrimination precision calculated using the additional training data (for testing) have been improved after the additional training compared with those before the additional training (S401). If the discrimination precisions have not been improved after the additional training compared with those before the additional training, the procedure advances to step S402, and, if the discrimination precisions have been improved after the additional training compared with those before the additional training, the procedure advances to step S403.

Note that the evaluation processing unit 5023 may decide the range in which whether or not the discrimination precisions have been improved after the additional training compared with those before the additional training is determined, according to the user's needs. For example, for a user who wants to improve only the discrimination precision at least for an additionally trained attribute (attribute associated with the additional training data), the evaluation processing unit 5023 may advance the processing procedure to step S403 if both the discrimination precision calculated using the evaluation data associated with the same attribute as the attribute of the additional training data, and the discrimination precision calculated using the additional training data (for testing) have been improved after the additional training compared with those before the additional training. On the other hand, for a user who wants to also prevent the discrimination precision for an attribute similar to the additionally trained attribute from deteriorating, the evaluation processing unit 5023 may determine whether or not the discrimination precision for the attribute similar to the additionally trained attribute has deteriorated after the additional training compared with that before the additional training, and advance the processing procedure to step S403 if the discrimination precision has not deteriorated. Information regarding what attributes are similar to each other may be defined in advance in a setting file or the like.

Subsequently, the receiving unit 504 receives an instruction as to whether or not to update the discriminator 222B included in the image processing apparatus 200 to the additionally trained discriminator 5013A, from a user (S402). If an instruction to update the discriminator is received, the procedure advances to step S403, and, if an instruction not to update the discriminator is received, the processing is ended. The update unit 505 updates the discriminator 222B included in the image processing apparatus 200 to the additionally trained discriminator 5013A (S403).

Note that, in the processing procedure shown in FIG. 14, the processing procedure may advance to step S402 regardless of a result of the processing procedure in step S401. That is to say, regardless of whether or not the discrimination precisions have been improved after the additional training compared with those before the additional training, in the processing procedure in step S402, the user may be urged to determine whether or not to update the discriminator 222B of the image processing apparatus 200 to the additionally trained discriminator 5013A. Accordingly, the discriminator 222B of the image processing apparatus 200 is not updated without permission from the user, and thus the user feels more secure.

Although embodiments have been described above in detail, the aforementioned description is, in all respects, merely illustrative of the present invention. Needless to say, various improvements and modifications can be made without departing from the scope of the invention.

Additional Remark 1

A detection system (1) including:

an image processing apparatus (200) including an image capturing unit (230) and a trainable discriminator, and configured to discriminate, using the discriminator, whether or not there is a detection target contained in an object whose image has been captured by the image capturing unit (230); and an information processing apparatus (100) configured to provide the discriminator to the image processing apparatus, wherein the information processing apparatus (100) includes:

a first storage unit (5013) configured to store a discriminator trained to discriminate whether or not there is a detection target contained in an object;

a second storage unit (5021) configured to store evaluation data for use in evaluation of a discrimination precision of the discriminator, in association with each of a plurality of attributes of an object;

a third storage unit (5011A) configured to store training data for additionally training the discriminator;

a training unit (5014) configured to additionally train the discriminator using the training data;

an evaluation unit (5023) configured to evaluate, for each attribute, discrimination precisions of the discriminator before the additional training and after the additional training, using the evaluation data; and an output unit (503) configured to output the discrimination precisions for each attribute.

Additional Remark 2

The detection system according to Additional Remark 1, wherein the information processing apparatus (100) further includes a receiving unit (5012) configured to receive designation of at least one of the plurality of attributes from a user, and the evaluation unit (5023) evaluates discrimination precisions of the discriminator before the additional training and after the additional training, for the received at least one attribute.

Additional Remark 3

The detection system according to Additional Remark 1 or 2, wherein the third storage unit (5011A) stores the training data in association with at least one of the plurality of attributes, and the output unit (503) performs output such that the at least one attribute associated with the training data is identifiable.

Additional Remark 4

The detection system according to Additional Remark 3, wherein the information processing apparatus (100) further includes a registration unit (5012) configured to receive the training data and the at least one attribute that is associated with the training data from a user, and register them into the third storage unit (5011A).

Additional Remark 5

The detection system according to Additional Remark 3 or 4, wherein the information processing apparatus (100) further includes an update unit (505) configured to perform processing of updating the discriminator included in the image processing apparatus to the discriminator additionally trained by the training unit (5014), based on evaluation of the discrimination precisions for each attribute by the evaluation unit (5023).

Additional Remark 6

The detection system according to Additional Remark 5, wherein the update unit (505) performs processing of updating the discriminator included in the image processing apparatus to the discriminator additionally trained by the training unit (5014), if the discrimination precision evaluated using the evaluation data, for the at least one attribute associated with the training data, is higher after the additional training than before the additional training.

Additional Remark 7

The detection system according to Additional Remark 5, wherein the update unit (505) performs processing of updating the discriminator included in the image processing apparatus to the discriminator additionally trained by the training unit (5014), if an instruction to update the discriminator is received from a user.

Additional Remark 8

The detection system according to Additional Remark 4, wherein the registration unit (5012) additionally registers the training data as new evaluation data into the second storage unit (5021), in association with the at least one attribute associated with the training data.

Additional Remark 9

The detection system according to any one of Additional Remarks 1 to 8, wherein the evaluation unit (5023) receives, for each attribute, designation of the number of pieces of evaluation data for use in evaluation of the discriminator, from a user, and evaluates, for each attribute, the discrimination precision using the received number of pieces of evaluation data.

Additional Remark 10

An information processing apparatus (100) including:

a first storage unit (5013) configured to store a discriminator trained to discriminate whether or not there is a detection target contained in an object;

a second storage unit (5021) configured to store evaluation data for use in evaluation of a discrimination precision of the discriminator, in association with each of a plurality of attributes of an object;

a third storage unit (5011A) configured to store training data for additionally training the discriminator;

a training unit (5014) configured to additionally train the discriminator using the training data;

an evaluation unit (5023) configured to evaluate, for each attribute, discrimination precisions of the discriminator before the additional training and after the additional training, using the evaluation data; and an output unit (503) configured to output the discrimination precisions for each attribute.

Additional Remark 11

An evaluation method performed by an information processing apparatus (100) including a first storage unit (5013) configured to store a discriminator trained to discriminate whether or not there is a detection target contained in an object, a second storage unit (5021) configured to store evaluation data for use in evaluation of a discrimination precision of the discriminator, in association with each of a plurality of attributes of an object, and a third storage unit (5011A) configured to store training data for additionally training the discriminator, the method including:

a step of additionally training the discriminator using the training data;

a step of evaluating, for each attribute, discrimination precisions of the discriminator before the additional training and after the additional training, using the evaluation data; and a step of outputting the discrimination precisions for each attribute.

Additional Remark 12

A program for causing a computer (100) to function as:

a first storage part (5013) configured to store a discriminator trained to discriminate whether or not there is a detection target contained in an object;

a second storage part (5021) configured to store evaluation data for use in evaluation of a discrimination precision of the discriminator, in association with each of a plurality of attributes of an object;

a third storage part (5011A) configured to store training data for additionally training the discriminator;

a training part (5014) configured to additionally train the discriminator using the training data;

an evaluation part (5023) configured to evaluate, for each attribute, discrimination precisions of the discriminator before the additional training and after the additional training, using the evaluation data; and an output part (503) configured to output the discrimination precisions for each attribute.

The invention claimed is:

1. A detection system comprising:
an image processing apparatus comprising:
a first processor; and
an image capturing unit comprising an image sensor capturing an image, wherein the first processor is configured with a first program to perform operations comprising operation as a first trainable discriminator configured to discriminate whether there is a defect contained in an object in the image captured by the image capturing unit; and
an information processing apparatus comprising a second processor configured with a second program to perform operations comprising operation as a second trainable discriminator configured to update the first trainable discriminator of the image processing apparatus,
wherein the information processing apparatus further comprises:
a first memory storing discriminator data for the second trainable discriminator;
a second memory storing evaluation data for use in evaluation of a discrimination precision of the first trainable discriminator, in association with each of a plurality of attributes of the object;
a third memory storing training data for additionally training the first trainable discriminator;
the second processor is further configured with the second program to perform operations comprising:
operation as a training unit configured to additionally train the first trainable discriminator using the training data;
operation as an evaluation unit configured to evaluate, for each attribute, discrimination precisions of the first trainable discriminator before the additional training and after the additional training, using the evaluation data, wherein the discrimination precisions comprise an accuracy of the first trainable discriminator in discriminating whether the defect is contained in the object; and
operation as an output unit configured to output the discrimination precisions for each attribute.

2. The detection system according to claim 1,
wherein the second processor is configured with the second program to perform operations further comprising: operation as a receiving unit configured to receive designation of at least one of the plurality of attributes from a user, and
the second processor is configured with the second program to perform operations such that operation the evaluation unit comprises evaluating discrimination precisions of the first trainable discriminator before the additional training and after the additional training, for the received at least one attribute.

3. The detection system according to claim 2,
wherein the third memory stores the training data in association with at least one of the plurality of attributes, and
the second processor is configured with the second program to perform operations such that operation as the output unit comprises performing output such that the at least one attribute associated with the training data is identifiable.

4. The detection system according to claim 3, wherein the second processor is configured with the second program to perform operations further comprising operation as a registration unit configured to receive the training data and the at least one attribute associated with the training data from a user, and register the training data and the at least one attribute into the third memory.

5. The detection system according to claim 2, wherein the second processor is configured with the second program to perform operations such that operation as the evaluation unit comprises receiving, for each attribute, designation of the number of pieces of evaluation data for use in evaluation of the first trainable discriminator, from a user, and evaluates, for each attribute, the discrimination precision using the received number of pieces of evaluation data.

6. The detection system according to claim 1, wherein
the third memory stores the training data in association with at least one of the plurality of attributes, and
the second processor is configured with the second program to perform operations such that operation as the output unit comprises performing output such that the at least one attribute associated with the training data is identifiable.

7. The detection system according to claim 6, wherein the second processor is configured with the second program to perform operations further comprising operation as a registration unit configured to receive the training data and the at least one attribute associated with the training data, and to register the training data and the at least one attribute into the third memory.

8. The detection system according to claim 7, wherein the second processor is configured with the second program to perform operations such that operation as the registration unit comprises additionally registering the training data as new evaluation data into the second memory, in association with the at least one attribute associated with the training data.

9. The detection system according to claim 6, the second processor is configured with the second program to perform operations further comprising operation as an update unit configured to update the first trainable discriminator included in the image processing apparatus to the second trainable discriminator additionally trained by the training unit, based on evaluation of the discrimination precisions for each attribute by the evaluation unit.

10. The detection system according to claim 9, wherein the second processor is configured with the second program to perform operations such that operation as the update unit comprises processing of updating the first trainable discriminator included in the image processing apparatus to the second trainable discriminator additionally trained by the training unit, if the discrimination precision evaluated using the evaluation data, for the at least one attribute associated with the training data, is higher after the additional training than before the additional training.

11. The detection system according to claim 9, wherein the second processor is configured with the second program to perform operations such that operation as the update unit comprises processing of updating the first trainable discriminator included in the image processing apparatus to the second trainable discriminator additionally trained by the training unit, if an instruction to update the first trainable discriminator is received from a user.

12. The detection system according to claim 6, wherein the second processor is configured with the second program to perform operations such that operation as the evaluation unit comprises receiving, for each attribute, designation of the number of pieces of evaluation data for use in evaluation of the first trainable discriminator, from a user, and evaluates, for each attribute, the discrimination precision using the received number of pieces of evaluation data.

13. The detection system according to claim 1, wherein the second processor is configured with the second program to perform operations such that operation as the evaluation unit comprises receiving, for each attribute, designation of the number of pieces of evaluation data for use in evaluation of the first trainable discriminator, from a user, and evaluates, for each attribute, the discrimination precision using the received number of pieces of evaluation data.

14. An information processing apparatus comprising:
a first memory storing discriminator data for a trainable discriminator trained to discriminate whether there is a defect contained in an object;
a second memory storing evaluation data for use in evaluation of a discrimination precision of the trainable discriminator, in association with each of a plurality of attributes of the object;
a third memory storing training data for additionally training the trainable discriminator; and
a processor configured with a program to perform operations comprising:
operation as a training unit configured to additionally train the trainable discriminator using the training data;
operation as an evaluation unit configured to evaluate, for each attribute, discrimination precisions of the trainable discriminator before the additional training and after the additional training, using the evaluation data, wherein the discrimination precisions comprise an accuracy of the trainable discriminator in discriminating whether the defect is contained in the object; and
operation as an output unit configured to output the discrimination precisions for each attribute.

15. An evaluation method for additionally training a trainable discriminator to discriminate whether a defect is contained in an object, the evaluation method performed by an information processing apparatus comprising a first memory storing discriminator data for a trainable discriminator trained to discriminate whether there is a defect contained in an object, a second memory storing evaluation data for use in evaluation of a discrimination precision of the trainable discriminator, in association with each of a plurality of attributes of an object, and a third memory storing training data for additionally training the trainable discriminator, the method comprising:
additionally training the trainable discriminator using the training data;
evaluating, for each attribute, discrimination precisions of the trainable discriminator before the additional training and after the additional training, using the evaluation data, wherein the discrimination precisions comprise an accuracy of the trainable discriminator in discriminating whether the defect is contained in the object; and
outputting the discrimination precisions for each attribute.

16. A non-transitory computer-readable recording medium storing a program, which when read and executed, for causing a computer comprising a first memory storing discriminator data for a trainable discriminator trained to discriminate whether there is a defect contained in an object, a second memory storing evaluation data for use in evaluation of a discrimination precision of the trainable discriminator, in association with each of a plurality of attributes of an object, a third memory storing training data for additionally training the trainable discriminator, to perform operations comprising:
operation as a training part configured to additionally train the trainable discriminator using the training data;
operation as an evaluation part configured to evaluate, for each attribute, discrimination precisions of the trainable discriminator before the additional training and after the additional training, using the evaluation data, wherein the discrimination precisions comprise an accuracy of the trainable discriminator in discriminating whether the defect is contained in the object; and
operation as an output part configured to output the discrimination precisions for each attribute.

17. The method according to claim 15, further comprising:
receiving designation of at least one of the plurality of attributes from a user; and
evaluating discrimination precisions of the trainable discriminator before the additional training and after the additional training, for the received at least one attribute.

18. The method according to claim 15, further comprising:
storing the training data in association with at least one of the plurality of attributes; and
outputting the discrimination precisions for each attribute such that the at least one attribute associated with the training data is identifiable.

19. The method according to claim 18, further comprising:
registering the training data and the at least one attribute to the third memory.

* * * * *